Figure 1:
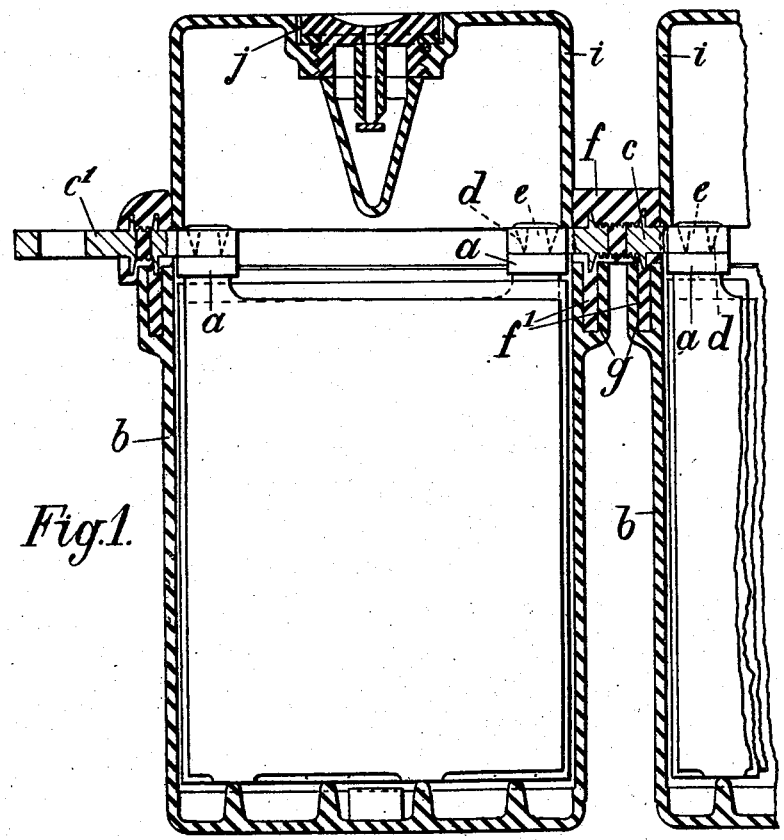

Dec. 2, 1952     E. S. CHAPMAN     2,620,370
ELECTRICAL STORAGE BATTERY

Filed Oct. 4, 1950     2 SHEETS—SHEET 1

Inventor
E. S. Chapman
By Glascock Downing Tuttle
Attys.

Dec. 2, 1952 E. S. CHAPMAN 2,620,370
ELECTRICAL STORAGE BATTERY
Filed Oct. 4, 1950 2 SHEETS—SHEET 2
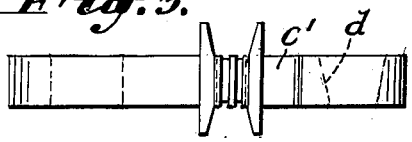
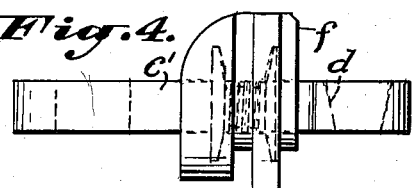
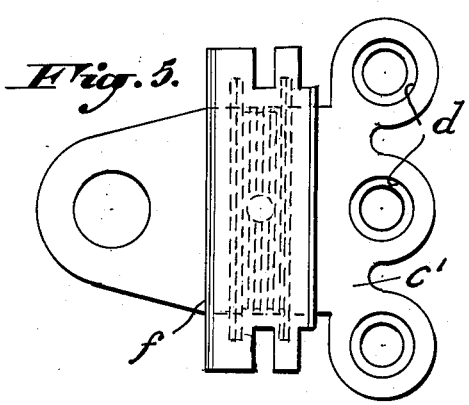
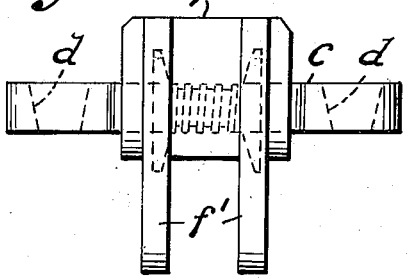
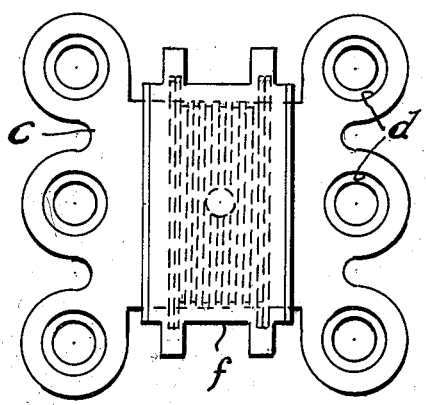
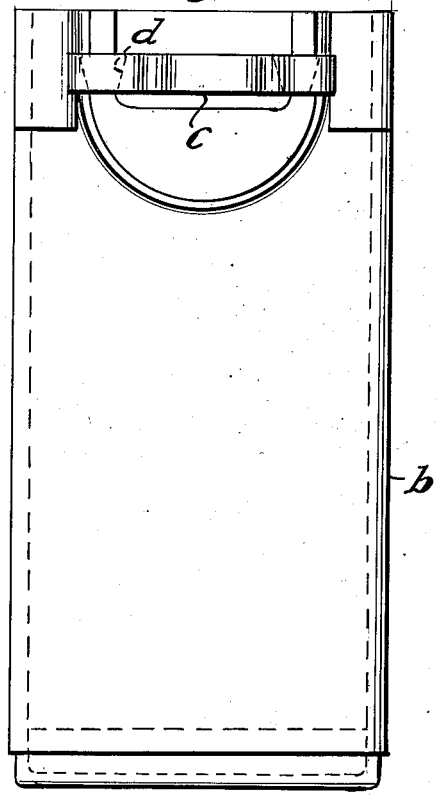
Inventor
Edward S. Chapman
By
Attorneys.

Patented Dec. 2, 1952

2,620,370

UNITED STATES PATENT OFFICE 2,620,370

ELECTRICAL STORAGE BATTERY

Edward Spence Chapman, Dagenham Dock, England, assignor to Pritchett & Gold and E. P. S. Company Limited, Dagenham Dock, England Application October 4, 1950, Serial No. 188,436
In Great Britain September 7, 1949

2 Claims. (Cl. 136—134)

This invention relates to electrical storage batteries.

For certain uses, e. g. in aircraft, such batteries commonly comprise a bank of cells the pillar bars in adjacent cells of which are connected to each other by means of inter-cell connectors of lead alloy. This arrangement has the drawbacks that substantial space is occupied by the connection strips, the strips may be exposed and thus there is a liability of short circuit and the weight of the pillar bars and inter-cell connectors is substantial.

The object of the present invention is to provide improved constructions of secondary batteries embodying two or more separate cells which avoid these drawbacks.

The invention consists in an electrical storage battery comprising a plurality of separate cells the containers of which embody notches for accommodating short straight electrically connecting bars of lead or lead alloy furnished with means for electrical connection to the respective plate bridges and with insulating material adapted mechanically to engage and to be sealed to pockets provided on adjacent walls of adjacent cell casings. These bars can be made much shorter than is normally possible because of this construction.

The invention also consists in an electrical storage battery as set forth in the preceding paragraph wherein said pockets comprise substantially U-shaped grooves in notched parts integral with the upper ends of two opposite casing walls, with which grooves corresponding ridges of insulating material partially encircling said inter-cell connecting bars engage.

The invention also consists in an electrical storage battery as set forth in either of the two preceding paragraphs, wherein the ends of the inter-cell connecting bars are furnished with one or more holes for receiving therein upstanding lugs on the plate bridges for enabling burning-on of these bars to be effected.

The invention also consists in an electrical storage battery as set forth in any of the three preceding paragraphs, wherein said insulating material comprises polystyrene or other suitable plastic, preferably applied by the injection-moulding process.

The invention also consists in an electrical storage battery having cells connected together substantially as hereinafter described with reference to the accompanying drawings.

Figure 2:
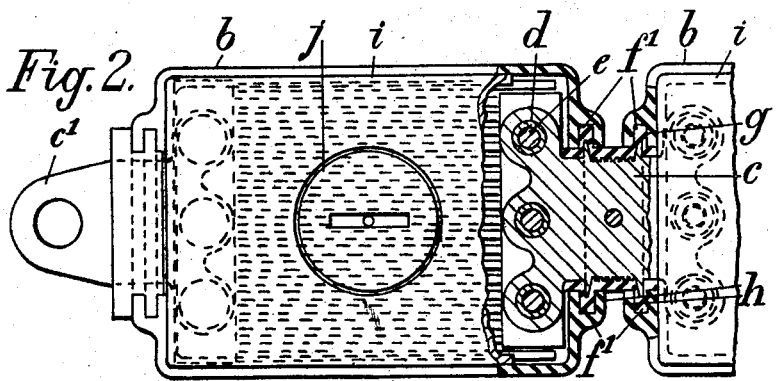

Referring to the accompanying diagrammatic drawings:

Figure 1 is a vertical sectional view of part of a battery of secondary cells embodying the present invention in one form, and Figure 2 is a sectional plan view thereof.

Figure 3 shows in elevation an end connecting bar before the plastic is molded thereon at an intermediate point, Figure 4 is a view similar to Figure 3 with a plastic molding thereon, Figure 5 is a plan view of the arrangement shown in Figure 4, Figure 6 is an elevation view of a cell interconnecting bar with a plastic molding thereon, Figure 7 is a plan view of the arrangement shown in Figure 6, and, Figure 8 shows the side of a cell case with the open pocket into which the depending flange of the connecting bar is placed to hold the connecting bar in position for cementing.

In carrying the invention into effect according to one convenient form by way of example, I provide a plurality of separate cells supported on a light metal base (not shown). I connect together adjacent plate bridges $a$ in adjacent cells $b$ by means of short straight inter-cell connecting bars $c$ of lead or lead alloy. In Figure 1 there is shown only one interconnecting bar $c$ and end connecting bar $c'$. Each inter-cell connecting bar is of sufficient length to extend over the two adjacent bridges $a$ and each end of the interconnecting bar is furnished with, say, three tapered holes $d$ for receiving therein three small upstanding lead tapered pillars $e$ on the bridges $a$ whereby the bars $c$ may be burned-on to the bridges after being placed in position, thus substantially eliminating the usual pillar bars of much greater length which normally extend from the plate bridges through the cell lid and down again in the adjacent cell. The centre portion of each bar $c$, $c'$ is embedded in insulating material $f$ comprising polystyrene or other suitable plastic. This material is conveniently applied by the injection-moulding process and is so shaped, as to provide two parallel U-shaped depending flanges $f'$ spaced apart to an extent enabling them to enter complementary U-shaped grooved pockets $g$ provided near the upper ends of the adjacent walls of the cell casings. Only one depending flange $f'$ is provided on the end connecting bar.

Each pocket is formed in an enlarged portion $h$ of the casing which is suitably notched to accommodate the covered portion of the bar. The length of the covered portion $f$ of the bar is preferably such that the ends of this portion lie flush with the inner surfaces of the respective cell walls when the bar is lowered into position with the ridges $f'$, $f'$ closely engaging the complementary grooves in the pockets and with the holes $d$ at the ends of the bars accommodating the upstanding lugs $e$.

An inverted cup-shaped cover $i$ is provided for each cell which is a press fit within the upper end of the casing $b$.

At each end of each row the connecting bar is somewhat modified to accommodate an external terminal $c'$ for enabling connections to be made to the battery and between end batteries in the two rows (by means of a link).

Each cover is provided with a suitable detachable plug $j$ which may be of non-spill or approximately non-spill type.

Such construction lends itself to the adoption of visual acid levels which is an important feature with aircraft batteries of the non-spill or approximately non-spill types because if the proper acid level is exceeded the features rendering them non-spillable or approximately non-spillable are rendered inoperative.

In erecting the battery, the cells are placed in position on the base member in spaced apart relationship and the connecting bars $c$ with their coverings $f$ are lowered into position after application to the pocket grooves $g$ and covering ridges $f'$ of a suitable cement, e. g., a solution of 6% polystyrene in toluene in the case where polystyrene is used for the casing.

After burning-on the connecting bars $c$ to the plate bridges $a$ the covers $i$ of the cells are pressed into position after applying a suitable cement to the engaging surfaces and a top cover, conveniently of light metal, is applied to the top of the cells and bolted into position to hold the cells firmly between the cover plate and base by means of vertical bolts or screws with which may be associated a carrying handle.

In accordance with the invention an extremely compact and light form of construction may be provided wherein there are no electrically exposed parts at the top of the battery and wherein the weight of the connecting strips is reduced to a minimum.

I claim:

1. An electrical storage battery cell comprising a plastic case, open top pockets provided on the outsides of two opposite walls of said cell, plates with plate bridges in said cell, an external electrical connector for each plate bridge, a plastic moulding around an intermediate part of each connector, each moulding comprising a part which enters a pocket so that the connector with moulding can be held in position by the pocket with both end portions of the connector bare and free of the moulding, the inner end portion being burnt on to a plate bridge, and the moulding being cemented to the plastic case, and a cover for the case which enters the open top of the case and seats on the inner end of each connector to hold the plates in position.

2. An electrical storage battery comprising at least two cells each of which includes a plastic case, open top pockets provided on the outside of two opposite walls of each of said cases, plates with plate bridges in said cases, an external electrical interconnector extending between said cases, a plastic moulding around an intermediate part of said interconnector, each moulding comprising parts which enter adjacent open top pockets on the adjacent walls of the cases so that the connector with moulding can be held in position by the two pockets with both end portions of the connector bare and free of the molding, the bare end portions being burnt on to plate bridges in the interconnector cases, the moulding being cemented to the plastic cases, and separate covers for the cases which seat on the inner ends of each interconnector to hold the plates in position.

EDWARD SPENCE CHAPMAN.

REFERENCES CITED

The following references are of record in the file of this patent:

UNITED STATES PATENTS

| Number | Name | Date |
|---|---|---|
| 421,081 | Mehren | Feb. 11, 1890 |
| 2,132,793 | Kyle | Oct. 11, 1938 |

FOREIGN PATENTS

| Number | Country | Date |
|---|---|---|
| 108,849 | Great Britain | Feb. 28, 1918 |
| 413,432 | Great Britain | July 19, 1934 |
| 576,866 | Great Britain | Apr. 24, 1946 |